US012565301B2

(12) United States Patent
Benthien et al.

(10) Patent No.: US 12,565,301 B2
(45) Date of Patent: Mar. 3, 2026

(54) COUPLING DEVICE FOR A CONNECTING ROD

(71) Applicant: Airbus Operations GmbH, Hamburg (DE)

(72) Inventors: Hermann Benthien, Hamburg (DE); Andreas Poppe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 412 days.

(21) Appl. No.: 18/157,435

(22) Filed: Jan. 20, 2023

(65) Prior Publication Data

US 2023/0234694 A1    Jul. 27, 2023

(30) Foreign Application Priority Data

Jan. 26, 2022    (EP) .................................... 22153403

(51) Int. Cl.
*F16B 37/08*      (2006.01)
*B64C 1/06*      (2006.01)
*F16B 9/00*      (2006.01)

(52) U.S. Cl.
CPC .............. *B64C 1/066* (2013.01); *F16B 9/054* (2018.08); *F16B 37/0892* (2013.01)

(58) Field of Classification Search
CPC .............. F16B 37/0871; F16B 37/0878; F16B 37/0892; F16B 37/0885

(Continued)

(56) References Cited

U.S. PATENT DOCUMENTS 766,890 A * 8/1904 Newberg ................ F16L 3/133
                                                          248/62
1,006,190 A * 10/1911 Estell .................. F16L 37/1215
                                                          279/7
(Continued)

FOREIGN PATENT DOCUMENTS

DE      102017131150 A1      6/2019
DE      102018109995 A1      10/2019
(Continued)

OTHER PUBLICATIONS

European Search Report dated Aug. 18, 2022; priority document.

*Primary Examiner* — Flemming Saether
(74) *Attorney, Agent, or Firm* — Greer, Burns & Crain, Ltd.

(57)      ABSTRACT

A connecting rod coupling device for attaching a component to an aircraft fuselage and/or stiffening the fuselage has a first coupler, and a second coupler couplable to the first coupler. The first coupler has an elongate body with a first channel on a lateral surface along a first longitudinal axis. The second coupler has a hollow-cylindrical portion, which, on an inner face along a second longitudinal axis, has a second channel complementing the first channel. The hollow-cylindrical portion has a radial cutout through which the elongate body is radially insertable into the second channel from outside the hollow-cylindrical portion. The second coupler has a closure body, which closes the radial cutout, and can be positioned removably in the cutout to complete the second channel on a radially internal face. The second coupler also has an element, pushable onto the hollow-cylindrical portion to secure the closure body on the hollow-cylindrical portion.

17 Claims, 5 Drawing Sheets

(58) Field of Classification Search
USPC ................................................ 411/433, 437
See application file for complete search history.

(56) References Cited

U.S. PATENT DOCUMENTS

| | | | | |
|---|---|---|---|---|
| 1,360,297 | A | * | 11/1920 | Jensen ................ F16B 37/0892 |
| | | | | 411/432 |
| 1,887,963 | A | * | 11/1932 | Stafford .................. B60C 29/02 |
| | | | | 152/428 |
| 4,901,958 | A | * | 2/1990 | Kelso ........................ F16L 3/11 |
| | | | | 248/59 |
| 5,842,668 | A | | 12/1998 | Spencer |
| 6,666,639 | B2 | * | 12/2003 | Van Gent ........... F16B 37/0892 |
| | | | | 411/432 |
| 7,658,582 | B2 | * | 2/2010 | Doubler ................ F16B 21/186 |
| | | | | 411/549 |
| 8,657,547 | B2 | * | 2/2014 | Herndon ............ F16L 19/0231 |
| | | | | 411/432 |
| 10,385,906 | B2 | * | 8/2019 | Huang ................ F16B 37/0821 |
| 11,499,584 | B2 | * | 11/2022 | Wu .................... F16B 37/0885 |
| 2008/0213034 | A1 | | 9/2008 | Wood et al. |
| 2013/0302112 | A1 | * | 11/2013 | Scherer ................... F16B 37/08 |
| | | | | 411/433 |
| 2018/0009530 | A1 | | 1/2018 | Benthien |
| 2019/0193872 | A1 | | 6/2019 | Benthien et al. |
| 2019/0329907 | A1 | | 10/2019 | Benthien et al. |

FOREIGN PATENT DOCUMENTS

| | | | |
|---|---|---|---|
| EP | 0861781 | A2 | 9/1998 |
| EP | 3266706 | A1 | 1/2018 |

* cited by examiner

COUPLING DEVICE FOR A CONNECTING ROD

CROSS-REFERENCES TO RELATED APPLICATIONS

This application claims the benefit of the European patent application No. 22153403.5 filed on Jan. 26, 2022, the entire disclosures of which are incorporated herein by way of reference.

FIELD OF THE INVENTION

The present description relates to a coupling device for a connecting rod for attaching a component to a fuselage structure of an aircraft and/or for stiffening the fuselage structure; to a fuselage structure of an aircraft; and to an aircraft having such a fuselage structure.

BACKGROUND OF THE INVENTION

To attach components in a fuselage structure of a vehicle, for instance overhead storage compartments, a wide variety of devices are known. These devices could comprise framework structures with framework members, which can be fastened to formers of a fuselage structure. Owing to manufacturing-related tolerances, here it is desired to provide a certain length adjustment of the framework members or of their attachment, with the result that, in the interior of the fuselage structure, a visually harmonious, rectilinear installation of components is enabled, and size deviations of the fuselage structure are taken into account in the process.

DE 10 2017 131 150 A1 describes a module system for installing modules on a fuselage structure of a vehicle. The system comprises multiple modules with holders arranged thereon that are intended for fastening to a fuselage structure, multiple mounting points that can be moved on a floor plane, and at least one connecting element which is flexible at least in certain regions, which extends over all of the modules and which couples them to one another in a state installed on the fuselage structure.

DE 10 2018 109 995 A1 describes a fastening system having a fastening element and at least one fastening device, which has a flange housing, a closure element, a hollow spherical element and a spherical insert. The hollow spherical element is pivotable in relation to the flange housing about a first pivot axis, while the spherical insert is pivotable in the hollow spherical element about a second pivot axis.

SUMMARY OF THE INVENTION

An object can be considered that of proposing an alternative coupling device which provides easy, quick mounting and effective tolerance compensation.

What is proposed is a coupling device for a connecting rod for attaching a component to a fuselage structure of an aircraft and/or for stiffening the fuselage structure, the coupling element having a first coupling element and a second coupling element, which can be coupled to the first coupling element, wherein the first coupling element has an elongate body, which has a first channel structure on a lateral surface along a first longitudinal axis, wherein the second coupling element has a hollow-cylindrical portion, which, on an inner face along a second longitudinal axis, has a second channel structure complementing the first channel structure, wherein the hollow-cylindrical portion has a radial cutout through which the elongate body can be inserted into the second channel structure from outside the hollow-cylindrical portion in a radial direction, wherein the second coupling element has a closure body, which is designed to close the radial cutout, can be positioned removably in the cutout and completes the second channel structure on a radially internal face, and wherein the second coupling element also has a securing element, which can be pushed onto the hollow-cylindrical portion in order to secure the closure body on the hollow-cylindrical portion.

The device is accordingly able to couple a connecting rod to a fuselage structure of an aircraft. One of the first coupling element and the second coupling element can be connected to the fuselage structure to that end. Meanwhile, the other one of the first coupling element and the second coupling element can be connected to the connecting rod. It can be appropriate to connect the second coupling element to the connecting rod.

The two coupling elements are designed to quickly establish a mutual mechanical connection. In this respect, it is also possible to directly compensate manufacturing-related tolerances when the connection is being established. The coupling device can be adapted to produce different degrees of fixedness. In particular, mechanical connections that are able to bear very high loads are also conceivable.

The first coupling element has an elongate body. The elongate body could comprise a largely constant cross section that defines a lateral surface along the first longitudinal axis. A first channel structure is arranged on this lateral surface. The first channel structure could be in the form of multiple, separate and spaced-apart channels. As an alternative to this, a thread which is merely a single channel running helically on the lateral surface would also be conceivable. This first channel structure serves to establish a form-fitting connection with the second coupling element and consequently acts as means for introducing a longitudinal force into the first coupling element.

The second coupling element has a hollow-cylindrical portion, the cavity of which is matched to the elongate body. This means that the elongate body and the cavity are dimensioned such that the elongate body can be introduced into the cavity of the hollow-cylindrical portion. The second channel structure, which is arranged on the inner surface of the hollow-cylindrical portion, complements the first channel structure in this respect. The channels of the second channel structure are consequently adapted so as to correspond to the channels of the first channel structure. If the elongate body is arranged in the hollow-cylindrical portion, the first and the second channel structure mesh with one another. The axial position of the elongate body and thus of the first coupling element relative to the second coupling element is thereby defined.

The first channel structure and the second channel structure are formed such that self-locking is achieved, with the result that an axial movement of the first channel structure in relation to the second channel structure is avoided. If the channel structures are in the form of internal or external threads, the thread pitch can be selected correspondingly to produce the self-locking. If the channel structures are formed such that they have separate, spaced-apart channels, the channels do not need a special form for this, given sufficient height.

A particular advantage of the coupling device according to the invention is that the hollow-cylindrical portion comprises the radial cutout. The radial cutout is dimensioned such that the elongate body can be introduced into the hollow-cylindrical portion from the outside in a radial direction, i.e., transversely in relation to the first and second longitudinal axis. Consequently, the first coupling element can already be connected to a fuselage structure of the aircraft, while a connecting rod with second coupling element arranged thereon can be connected to another component. By positioning the connecting rod on the first coupling element, it becomes possible to introduce the elongate body into the hollow-cylindrical portion.

In order to prevent the hollow-cylindrical portion falling out, the closure body is provided. The closure body is designed to at least partially close the radial cutout and, in the closed state, to complete the second channel structure. To connect the two coupling elements to one another, consequently the closure body is removed and then, when the elongate body is in the hollow-cylindrical portion, correspondingly repositioned. The first coupling element and the second coupling element are then arranged in a desired relative axial position that compensates size deviations. In order to avoid the closure body coming off, the securing element is provided. The securing element can be pushed onto the hollow-cylindrical portion in order to hold the closure body thereon. In the process, the closure body preferably surrounds the hollow-cylindrical portion completely and in a flush manner, with the result that a movement of the closure body is ruled out.

The coupling device according to the invention consequently allows quick connection of two coupling elements, and thus of a connecting rod to a fuselage structure of an aircraft, combined with automatic tolerance compensation. Such a coupling device can additionally likewise be easily released again by removing the securing element from the hollow-cylindrical portion in order to remove the closure body and separate the coupling elements from one another again.

In one advantageous embodiment, the first channel structure has an external thread, and the second channel structure has an internal thread. The first channel structure and the second channel structure can be produced easily with conventional tools for any desired load scenarios. In addition, when the securing element is closed, rotation of the first coupling element makes adjustment or preloading possible, if necessary. When conventional threads are used, it becomes possible to set the length of the combination of connecting rod and coupling device in a continuously variable manner.

In an advantageous embodiment, the first channel structure may have an arrangement of multiple, spaced-apart, parallel channels around the circumference, wherein the second channel structure has an arrangement of multiple, spaced-apart, parallel grooves around the circumference. The multiple channels and grooves allow settability in a determined pattern. Different groove depths and channel heights and also cross-sectional shapes of the channels and grooves can be matched to the use case.

In an advantageous embodiment, the securing element comprises a sleeve, which is mounted on the second coupling element so as to be axially displaceable. An inside diameter of the sleeve in this case corresponds to the outside diameter of the hollow-cylindrical portion. The closure body preferably terminates flush with the hollow-cylindrical portion in a radial direction. Consequently, the sleeve can easily be pushed over a region in which the closure body is arranged in the radial groove. By pushing the sleeve on in this region, the closure body is prevented from coming out of the radial cutout.

In an advantageous embodiment, the securing element comprises a compression spring, which forces the sleeve over the closure body. The compression spring has the result that the sleeve is always forced onto the closure body and consequently the coupling device always tends to assume a closed position. For the purposes of opening and closing, i.e., to remove and insert the closure body, the securing element is displaced away from the radial groove counter to the pressure of the compression spring and can be fixed there, at least temporarily. It is conceivable that, for this purpose, the hollow-cylindrical portion has a recess, a groove or the like into which a temporary securing means can be introduced, for example a pin or the like. To close the coupling device, the securing means can be removed again. As an alternative, it is also conceivable for the compression spring to exert only a rather small force on the sleeve, with the result that a user can push the sleeve away from the radial cutout very easily by hand, in order to introduce the closure body and then be able to release the sleeve again.

In an advantageous embodiment, the coupling device further has a stop element, which can be attached to the second coupling element and is designed to abut the securing element in a securing position. The stop element prevents the sleeve being displaced beyond the hollow-cylindrical portion, as a result of which it would be possible to reopen the coupling device. The stop element could be in the form either of a securing ring, a pin or the like.

In an advantageous embodiment, the closure body can be plugged into the radial cutout in a form-fitting manner in a radial and/or axial direction. Radially, the closure body could be designed completely independently from the second coupling element. The closure body can be placed against the radial cutout and inserted there in a radial direction. It could, for example, be plugged in in an axial direction, with it being moved substantially in an axial direction. Mixed forms are conceivable. The closure body can in addition also be fixed on the elongate body, with the result that, when the elongate body is being inserted into the hollow-cylindrical portion, the closure body is arranged directly in the radial cutout.

In an advantageous embodiment, the closure body comprises a ring portion, which can be plugged onto the elongate body, wherein the ring portion has a diameter which exceeds a diameter of the elongate body, with the result that at least one end, remote from the ring portion, of the closure body is movable in a radial direction in relation to the elongate body, or with the result that the closure body is rotatable around the elongate body. As a result of the ring portion, the closure body is arranged captively on the elongate body. A radially somewhat looser retention by the ring portion makes it possible to easily tilt the closure body in relation to the first longitudinal axis, with the result that it is tilted or moved obliquely radially into the radial cutout. If the intention is for the closure body to be rotatable on the elongate body as a result of the ring portion, the closure body can remain axially fixedly arranged on the elongate body and positioned in the radial cutout directly when the elongate body is being plugged in. The rotatability makes it possible to prevent canting. Such a ring portion makes it possible to handle the coupling device particularly easily.

In an advantageous embodiment, the cutout extends over a segment or a sector of the hollow-cylindrical portion. Consequently, it is possible for part of the circumference to be missing along the entire length of the hollow-cylindrical portion, this part being able to be filled by the closure body.

In an advantageous embodiment, the radial cutout has a first toothset, wherein the closure body has a second toothset which complements the first toothset, and wherein teeth of the first toothset and of the second toothset are spaced apart along the first longitudinal axis and the second longitudinal axis, respectively. Each toothset could point in a circumferential direction, with the result that the closure body can be attached to the radial cutout in a single, predefined position. It is favorable to separate the hollow-cylindrical portion during the manufacture, then to reassemble it and only then to manufacture the channel structure. Particularly preferably, the closure body is designed such that it can be attached to the hollow-cylindrical portion exclusively in a single orientation and incorrect positioning is ruled out by the toothsets. To that end, the toothsets could each have different designs on two opposite sides of the hollow-cylindrical portion or of the closure body, with the result that the closure body can be positioned thereon in only one orientation.

In an advantageous embodiment, the hollow-cylindrical portion has a radial viewing bore, which is arranged at a predefined distance from an end face of the second coupling element in order to check a minimum plug-in depth of the elongate body in the mounted state of the coupling device. The radial viewing bore allows the cavity of the second coupling element to be seen from the outside. If the radial bore is correspondingly positioned, it is possible to check whether the elongate body projects far enough into the cavity. If, for instance, it cannot be seen from the outside, the minimum plug-in depth has not been reached.

The invention moreover relates to an aircraft having an aircraft fuselage with a fuselage structure formed therein, to which fuselage structure the coupling device according to the description above can be attached.

In an advantageous embodiment, the fuselage structure comprises a former.

In an advantageous embodiment, the aircraft may also have at least one connecting rod, which is connected to the fuselage structure by means of the coupling device. The connecting rod can be used to stiffen the fuselage structure and/or to attach a component to the fuselage structure.

In an advantageous embodiment, the aircraft also has at least one component, which is coupled to the at least one connecting rod. The component could, for instance, be an equipment module for attachment in an upper area of a cabin, for example for bearing overhead storage compartments, a service duct, system installations or other devices.

BRIEF DESCRIPTION OF THE DRAWINGS

Exemplary embodiments are described in more detail below with reference to the appended drawings. The illustrations are schematic and not to scale. Identical reference signs refer to identical or similar elements. In the drawings.

DETAILED DESCRIPTION OF THE PREFERRED EMBODIMENTS

Figures 1, 2:
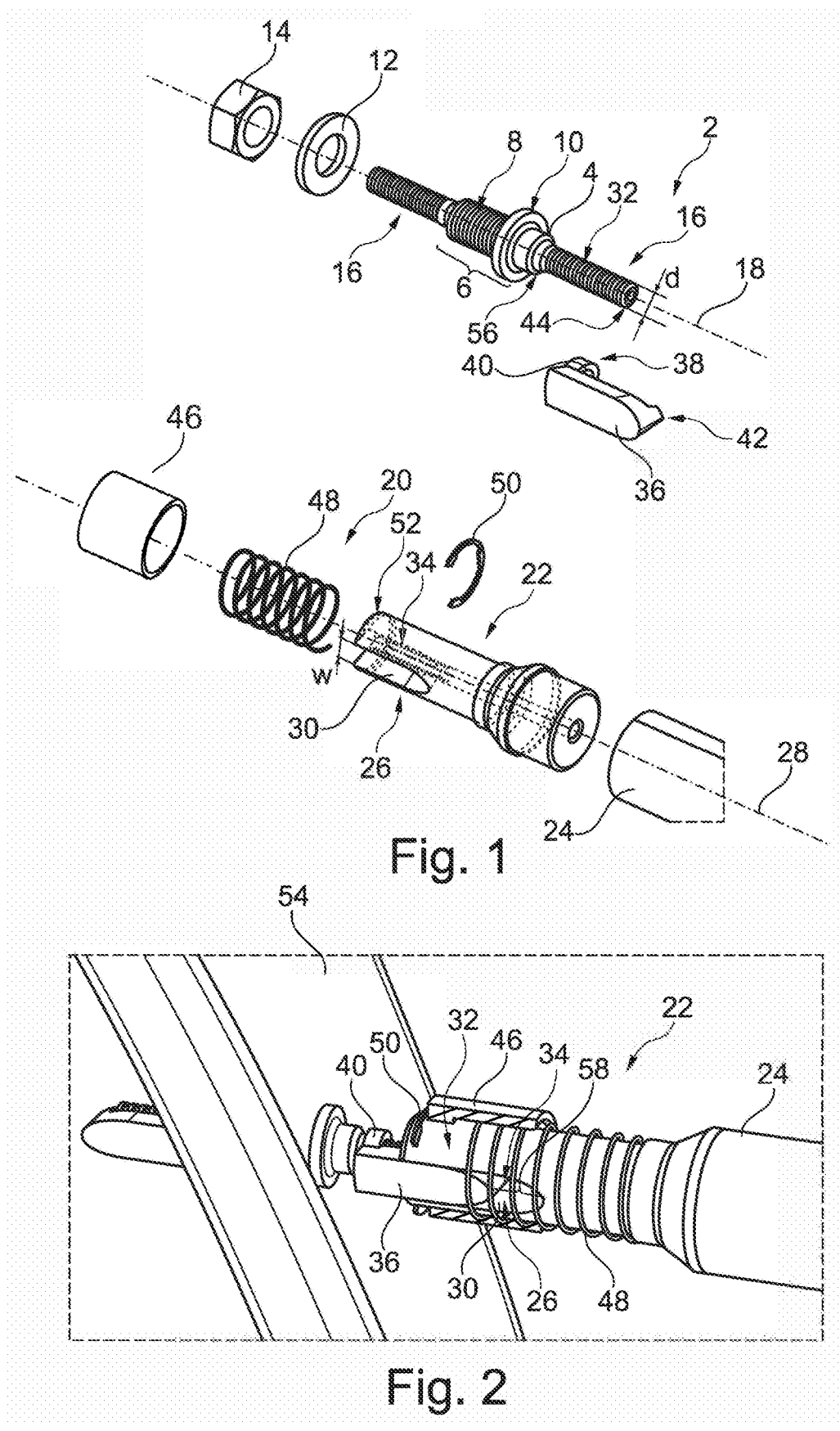
FIG. 1 shows an exploded illustration of a coupling device according to a first exemplary embodiment.
FIG. 2 shows a three-dimensional illustration of the coupling device according to the first exemplary embodiment.

FIG. 1 shows a first exemplary embodiment of a coupling device 2 in an exploded illustration. The coupling device 2 has a first coupling element 4, which is in the form of a stud bolt. A bolt portion 6 with a bolt thread 8 and a flange 10 around the circumference is screwed into an opening in a fuselage structure, which is not illustrated here, and secured by a washer 12 and a nut 14. An elongate body 16 is connected to both ends of the bolt portion 6. The first coupling element 4 is consequently able to be coupled to a second coupling element 20 at both ends along a first longitudinal axis 18.

The second coupling element 20 has a hollow-cylindrical portion 22, which can be fastened to a connecting rod 24. The hollow-cylindrical portion 22 has a radial cutout 26 with a width w which exceeds a diameter d of the elongate body 16. The elongate body 16 can consequently be introduced through the radial cutout 26 into a cavity 30 located therein from a radial side, i.e., transversely in relation to a second longitudinal axis 28.

On a circumferential surface, the elongate body 16 has a first channel structure 32, which corresponds or complements a second channel structure 34 in the cavity 30. The elongate body 16 is dimensioned such that it can be introduced completely into the cavity 30 and the first channel structure 32 meshes with the second channel structure 34. This makes it possible to provide a connection along the longitudinal axes 18 and 28. In order to prevent the elongate body 16 from coming out of the interior space 30 again, a closure body 36 is provided. The closure body is plugged into the radial cutout 26, wherein, in the plugged-in state, it terminates flush with a surface of the hollow-cylindrical portion 22.

The closure body 36 comprises a ring portion 38, which comprises an opening 40 that can be pushed onto the elongate body 16. On a side, remote from the ring portion 38, of the closure body 36, there is provided a radial projection 42 which protrudes transversely in relation to the first longitudinal axis 18 in front of the end face 44 of the elongate body 16. It may be provided that the closure body 36 can be tilted or moved transversely in relation to the first longitudinal axis 18.

As an alternative to this, already when the elongate body 16 is being plugged in, the projection 42 may be arranged in front of the end face 44 and terminate radially flush with the hollow-cylindrical portion 22 in different positions. This means that the elongate body 16 is simply plugged into the radial cutout 26, while part of the radial cutout 26 is already completely closed. In other variants, the closure body 36 could be axially still somewhat movable, in order to completely close the radial cutout 26.

In order to prevent the closure body 36 from coming out of the radial cutout 26, a securing element 46, which here is in the form of a sleeve, is provided. FIG. 1 shows the securing element, or the sleeve 46. The sleeve 46 is also shown in partial section view in FIG. 2. The sleeve 46 can be forced by a compression spring 48 into a position which is always over the closure body 36, which is arranged in the radial cutout 26. A stop element 50 in the form of a securing ring can be attached to the second coupling element 20 in a corresponding end-face groove 52 around the circumference, with the result that the securing element 46 is not forced beyond the closure body 36.

To couple the first coupling element 4 to the second coupling element 20, consequently the sleeve 46 is moved away from the radial cutout 26 along the second longitudinal axis 28, and the first coupling element 4 plugs together with the second coupling element 20, in order then to move the sleeve 46 in the direction of the groove 52 and insert the closure body 36 in the radial cutout 26. The two coupling elements 4 and 20 are then connected to one another.

FIG. 2 shows this in a three-dimensional illustration in the assembled state on a fuselage structure 54. Here, the connecting rod 24 is connected to the second coupling element 20. The sleeve 46 is located over the radial cutout 26, wherein the elongate body 16 is arranged in the cavity 30, with the result that the first channel structure 32 meshes with the second channel structure 34. The closure body 36 is located in the radial cutout 26, wherein the ring portion 40 is arranged on a portion 56 of the first coupling element 4. The closure body is fixed on the elongate body 16 in a direction along the first longitudinal axis 18, with the result that, in FIG. 2, by way of example, it leaves a gap 58 in the radial cutout 26. Since the securing element 46 encloses the hollow-cylindrical portion 22 and the closure body 36, the elongate body 16 is retained in the hollow-cylindrical portion 22. The first coupling element 4 may be mounted fixedly on the fuselage structure 54, wherein then the connecting rod 24, which is connected to a component that is not shown here, equipped with the second coupling element 20, can be attached to the first coupling element 4. The plug-in depth of the elongate body 16 depends on the dimensional tolerance of the fuselage structure 54 and the positioning of the component that is not shown here. A tolerance compensation is very quickly enabled, with the mounting merely requiring the plugging together of the two components 4 and 20, and the subsequent actuation of the sleeve 46.

Figures 3, 4:
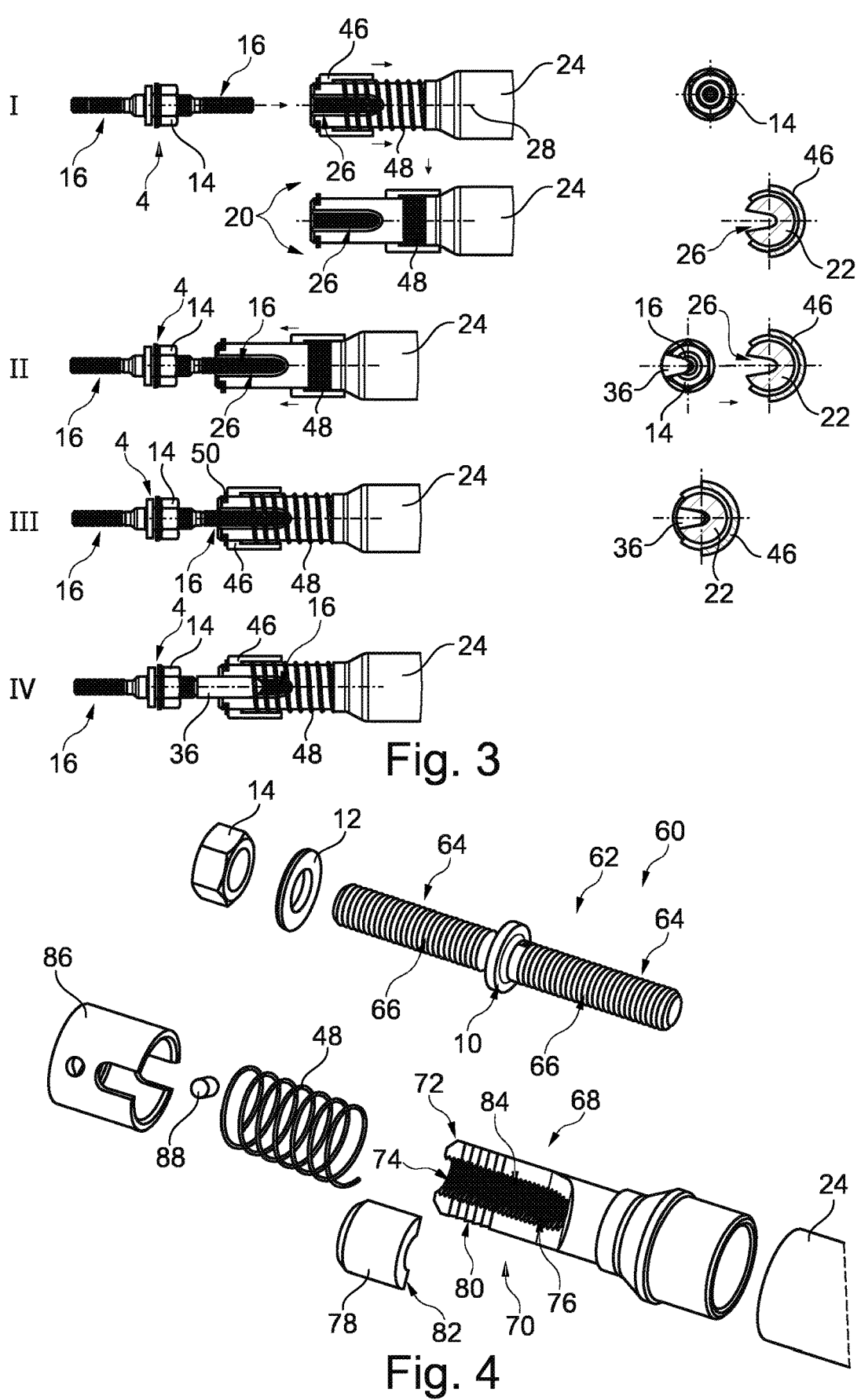
FIG. 3 shows a sequence of mounting steps in multiple side views with the coupling device according to the first exemplary embodiment.
FIG. 4 shows an exploded illustration of a coupling device according to a second exemplary embodiment.

FIG. 3 shows a sequence of the mounting in multiple, successive illustrations. In I, the first coupling element 4 and the second coupling element 20 are separate. To insert the elongate body 16, the sleeve 46 is displaced to the right in the plane of the drawing along the second longitudinal axis 28. In II, the elongate body 16 is positioned in the radial cutout 26. In III, the sleeve 46 continues to be displaced in the opposite direction and is retained there by the compression spring 48, which abuts the stop element 50. In IV, the closure body 36 is shown in the radial cutout 26.

FIG. 4 shows a further exemplary embodiment of a coupling device 60. A first coupling element 62 is likewise in the form of a stud bolt, but has a somewhat simpler configuration than in the illustration of FIG. 1. Here, two elongate bodies 64 which enclose a flange 10 are provided. Both elongate bodies 64 are equipped with a first channel structure in the form of a first thread 66, which is configured as an external thread, wherein their directions of rotation are mirror-inverted relative to the flange 10. The first coupling element 62 may be fastened to the fuselage structure 54 by a washer 12 and a nut 14.

A second coupling element 68, which can likewise be connected to the connecting rod 24, is provided. Here, a hollow-cylindrical portion 70 comprising a radial cutout 72 extending over at least 50% of a circumferential surface is provided. A second channel structure in the form of a second thread 76 that is configured as an internal thread and complements the first thread 66 is arranged in an interior space 74. The elongate body 64 can consequently be inserted into the interior space 74, with the result that the thread turns of the first thread 66 and of the second thread 76 mesh. If, owing to the current orientation, the thread turns do not match along the longitudinal axes 18 and 28 when the first coupling element 62 and the second coupling element 68 are being plugged together, the second coupling element 68 may be rotated by a certain angle until the thread turns mesh.

A closure body 78 designed to close at least an axial part of the radial cutout 72 is provided. The closure body 78 completes the interrupted lateral surface and can be introduced into a first toothset 80, which is arranged in the radial cutout 72. To that end, a second toothset 82 pointing in the circumferential direction can be provided. This makes it possible to axially orient the closure body 78 on the radial cutout 72.

A viewing bore 84 is provided in order to check a plug-in depth of the elongate body 64 from the outside. If the elongate body 64 cannot be seen in the viewing bore 84, a required plug-in depth has not been reached.

A securing element 86, which is likewise in the form of a sleeve, is pushed over the hollow-cylindrical portion 70 by means of the compression spring 48. A pin 88, which can be positioned correspondingly on the hollow-cylindrical portion 70, serves as a stop means.

Figure 5A:
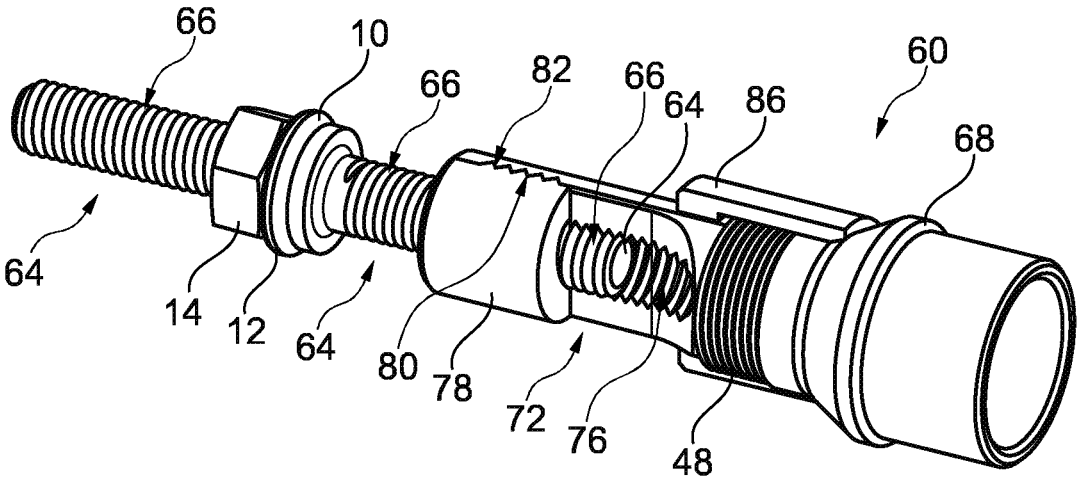
FIG. 5a-5b show two three-dimensional illustrations of the coupling device according to the second exemplary embodiment.
Figure 5B:
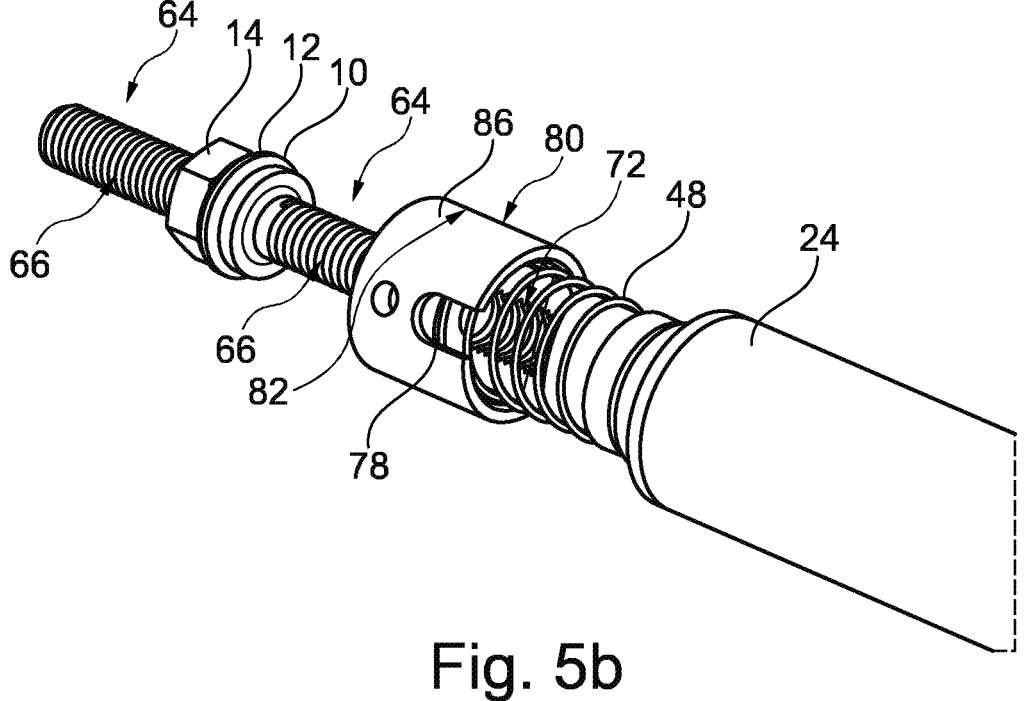

FIGS. 5a and 5b show the coupling device 60 in an assembled state. For reasons of clarity, the fuselage structure 54 is not shown here. In FIG. 5a, the elongate body 64 is positioned in the interior space 74 and in the process covers the viewing bore 84. The closure body 78 lies flush on the radial cutout 72, with the result that the toothsets 80 and 82 mesh. The securing element 86 is in this case pushed back counter to the spring force of the compression spring 48, with the result that the closure body 78 can be removed. In FIG. 5b, the securing element 86 is displaced into the closed position by means of the compression spring 48.

Figure 6:
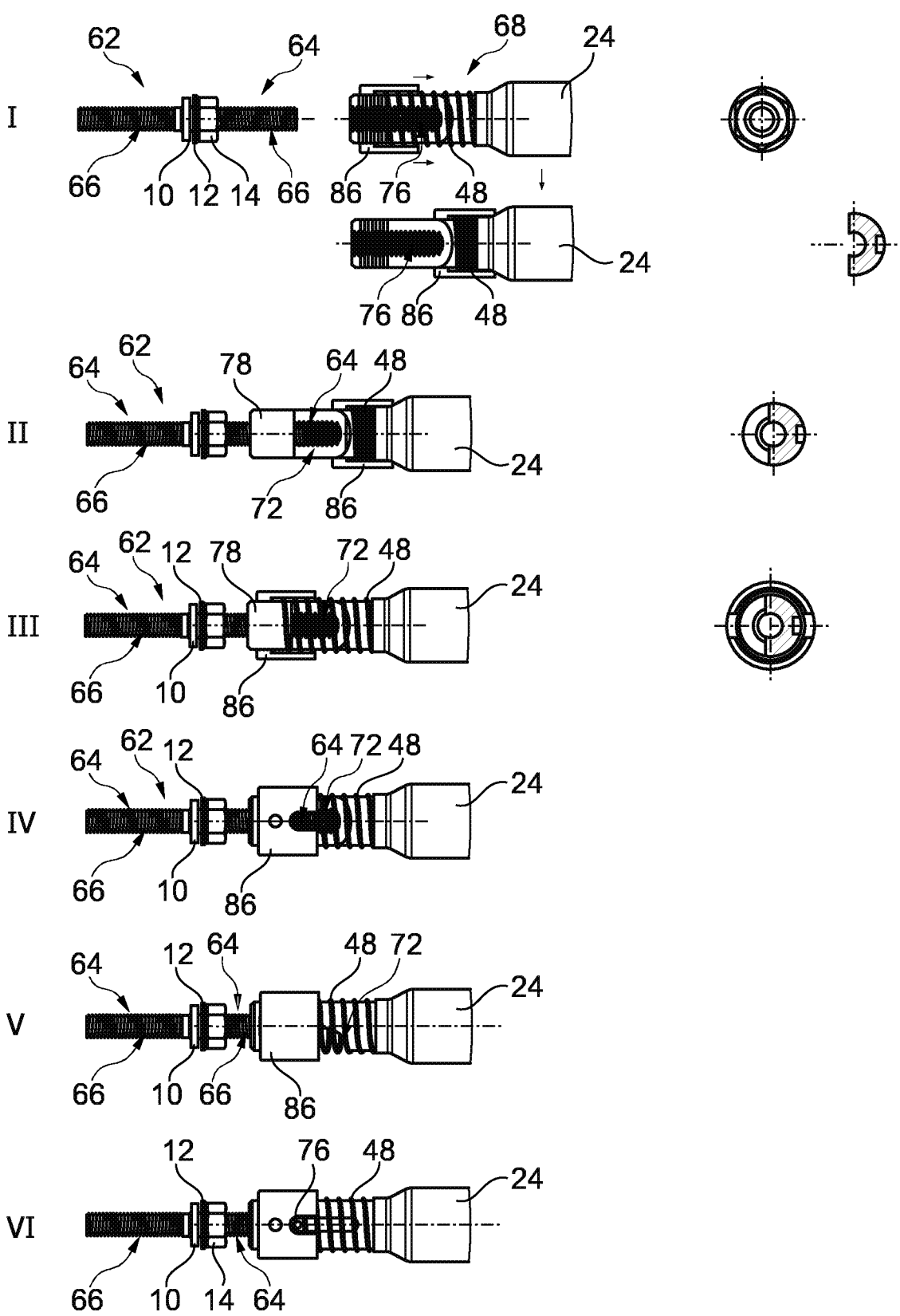
FIG. 6 shows a sequence of mounting steps in multiple side views with the coupling device according to the second exemplary embodiment.
Figure 7:
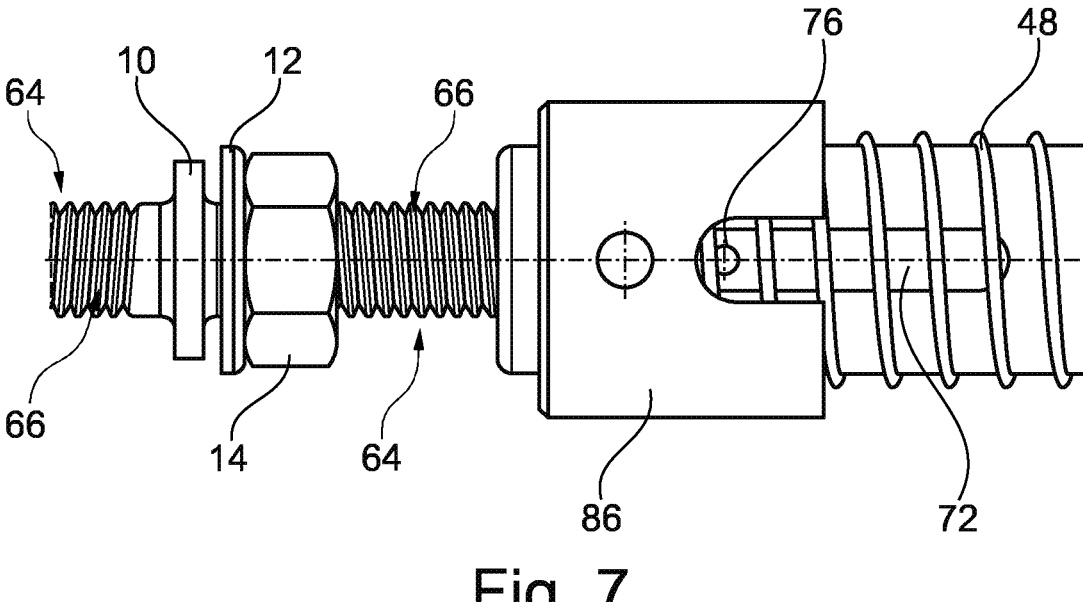
FIG. 7 is an enlarged view of the coupling device in the position of the final step of FIG. 6.

FIG. 6 shows a sequence of the mounting, similar to the illustration in FIG. 3. In I, the elongate body 64 is separate from the second coupling element 68. For mounting purposes, first of all the sleeve 86 is pushed back along the second longitudinal axis 28. Then, as illustrated in II, the elongate body 64 is introduced into the radial cutout 72 and the radial cutout 72 is closed by the closure body 78. Then, as illustrated in III, the sleeve 86 is pushed back again, with the result that the closure body 78 is retained. The further illustrations IV, V and VI show different views. In VI, the viewing bore 84 can be seen. In the case that is shown, the viewing bore is covered by the elongate body 64 and indicates that a required plug-in depth has been reached. FIG. 7 elucidates this further in an enlarged form.

Figure 8:
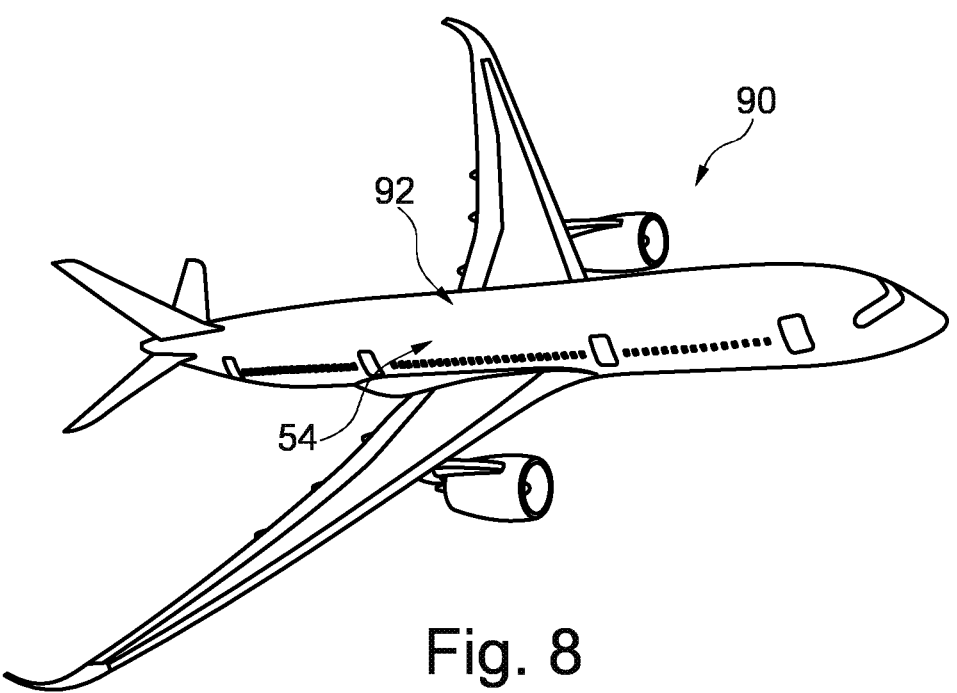
FIG. 8 is a perspective view of an airplane embodying the principles of the present invention.

Lastly, FIG. 8 shows an aircraft 90 which comprises a fuselage 92 in which a fuselage structure 94 is arranged. A connecting rod 24 can be fastened to the fuselage structure via the coupling device 2 or 60.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

2 Coupling device
4 First coupling element
6 Bolt portion
8 Bolt thread
10 Flange around the circumference
12 Washer
14 Nut
16 Elongate body
18 First longitudinal axis
20 Second coupling element
22 Hollow-cylindrical portion
24 Connecting rod
26 Radial cutout
28 Second longitudinal axis
30 Cavity
32 First channel structure
34 Second channel structure
36 Closure body
38 Ring portion
40 Opening
42 Radial projection
44 End face
46 Securing element/Sleeve
48 Compression spring
50 Stop element/Securing ring
52 Groove
54 Fuselage structure
56 Portion
58 Gap
60 Coupling device
62 First coupling element
64 Elongate body
66 First thread/External thread/First channel structure
68 Second coupling element
70 Hollow-cylindrical portion
72 Radial cutout
74 Interior space
76 Second thread/Internal thread/Second channel structure
78 Closure body
80 First toothset
82 Second toothset
84 Viewing bore
86 Securing element/Sleeve
88 Pin/Stop element
90 Aircraft
92 Aircraft fuselage
94 Fuselage structure
w Width
d Diameter

The invention claimed is:

1. A coupling device for a connecting rod for at least one of attaching a component to a fuselage structure of an aircraft or stiffening the fuselage structure, the coupling device comprising:
a first coupling element, and
a second coupling element, which can be coupled to the first coupling element,
wherein the first coupling element has an elongate body, which has a first channel structure on a lateral surface along a first longitudinal axis,
wherein the second coupling element has a hollow-cylindrical portion having a first axial length, which, on an inner face along a second longitudinal axis, has a second channel structure complementing the first channel structure, the first axial length extending from a first end of the hollow-cylindrical portion to a second end of the hollow-cylindrical portion along the second longitudinal axis,
wherein the hollow-cylindrical portion has a radial cutout through which the elongate body can be inserted into the second channel structure from outside the hollow-cylindrical portion in a radial direction,
wherein the second coupling element has a closure body, which is configured to close the radial cutout, can be positioned removably in the cutout and completes the second channel structure on a radially internal face, the closure body having a second axial length, the second axial length extending from a first end of the closure body to a second end of the closure body along the second longitudinal axis,
wherein the second coupling element also has a securing element, which can be pushed onto the hollow-cylindrical portion to secure the closure body on the hollow-cylindrical portion, and
wherein the first axial length is greater than the second axial length.

2. The coupling device as claimed in claim 1,
wherein the first channel structure has an external thread, and
wherein the second channel structure has an internal thread.

3. The coupling device as claimed in claim 1,
wherein the first channel structure has an arrangement of multiple, spaced-apart, parallel channels around the circumference, and
wherein the second channel structure has an arrangement of multiple, spaced-apart, parallel grooves around the circumference.

4. The coupling device as claimed in claim 1, wherein the securing element comprises a sleeve, which is mounted on the second coupling element so as to be axially displaceable.

5. The coupling device as claimed in claim 4, wherein the securing element comprises a compression spring, which forces the sleeve over the closure body.

6. The coupling device as claimed in claim 4, further comprising a stop element which can be attached to the second coupling element and is configured to abut the securing element in a securing position.

7. The coupling device as claimed in claim 1, wherein the closure body is configured to be plugged into the radial cutout in a form-fitting manner in at least one of a radial or axial direction.

8. The coupling device as claimed in claim 1,
wherein the closure body comprises a ring portion, which can be plugged onto the elongate body, and
wherein the ring portion has a diameter which exceeds a diameter of the elongate body, such that at least one end, remote from the ring portion, of the closure body is movable in a radial direction in relation to the elongate body, or with the result that the closure body is rotatable around the elongate body.

9. The coupling device as claimed in claim 1, wherein the cutout extends over a segment or a sector of the hollow-cylindrical portion.

10. The coupling device as claimed in claim 1,
wherein the radial cutout has a first toothset,
wherein the closure body has a second toothset which complements the first toothset, and
wherein teeth of the first toothset and of the second toothset are spaced apart along the first longitudinal axis and second longitudinal axis, respectively.

11. The coupling device as claimed in claim 1, wherein the hollow-cylindrical portion has a radial viewing bore, arranged at a predefined distance from an end face of the second coupling element to check a minimum plug-in depth of the elongate body in the mounted state of the coupling device.

12. The coupling device as claimed in claim 1, wherein the first coupling element comprises a flange extending radially from the elongate body.

13. An aircraft comprising:

an aircraft fuselage with a fuselage structure formed therein; and a coupling device attached to the fuselage structure, the coupling device comprising:

a first coupling element, and a second coupling element, which can be coupled to the first coupling element, wherein the first coupling element has an elongate body, which has a first channel structure on a lateral surface along a first longitudinal axis, wherein the second coupling element has a hollow-cylindrical portion having a first axial length, which, on an inner face along a second longitudinal axis, has a second channel structure complementing the first channel structure, the first axial length extending from a first end of the hollow-cylindrical portion to a second end of the hollow-cylindrical portion along the second longitudinal axis, wherein the hollow-cylindrical portion has a radial cutout through which the elongate body can be inserted into the second channel structure from outside the hollow-cylindrical portion in a radial direction, wherein the second coupling element has a closure body, which is configured to close the radial cutout, can be positioned removably in the cutout and completes the second channel structure on a radially internal face, the closure body having a second axial length, the second axial length extending from a first end of the closure body to a second end of the closure body along the second longitudinal axis, wherein the second coupling element also has a securing element, which can be pushed onto the hollow-cylindrical portion to secure the closure body on the hollow-cylindrical portion, and wherein the first axial length is greater than the second axial length.

14. The aircraft as claimed in claim 13, wherein the fuselage structure comprises a former.

15. The aircraft as claimed in claim 13, further comprising at least one connecting rod, connected to the fuselage structure by means of the coupling device.

16. The aircraft as claimed in claim 15, further comprising at least one component coupled to the at least one connecting rod.

17. A coupling device for a connecting rod for at least one of attaching a component to a fuselage structure of an aircraft or stiffening the fuselage structure, the coupling device comprising:

a first coupling element, and a second coupling element, which can be coupled to the first coupling element, wherein the first coupling element has an elongate body, which has a first channel structure on a lateral surface along a first longitudinal axis, wherein the second coupling element has a hollow-cylindrical portion, which, on an inner face along a second longitudinal axis, has a second channel structure complementing the first channel structure, wherein the hollow-cylindrical portion has a radial cutout through which the elongate body can be inserted into the second channel structure from outside the hollow-cylindrical portion in a radial direction, wherein the second coupling element has a closure body, which is configured to close the radial cutout, can be positioned removably in the cutout and completes the second channel structure on a radially internal face, wherein the second coupling element also has a securing element, which can be pushed onto the hollow-cylindrical portion to secure the closure body on the hollow-cylindrical portion, and wherein the securing element comprises a sleeve and a compression spring, the sleeve being mounted on the second coupling element so as to be axially displaceable and biased the compression spring.

* * * * *